United States Patent
Mitsui

(10) Patent No.: US 10,158,266 B2
(45) Date of Patent: Dec. 18, 2018

(54) MOTOR HAVING INTERPHASE INSULATION SHEET MOUNTED THEREON

(71) Applicant: FANUC CORPORATION, Yamanashi (JP)

(72) Inventor: Hidetoshi Mitsui, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/841,587

(22) Filed: Dec. 14, 2017

(65) Prior Publication Data

US 2018/0175693 A1 Jun. 21, 2018

(30) Foreign Application Priority Data

Dec. 16, 2016 (JP) .................. 2016-244563

(51) Int. Cl.
*H02K 1/00* (2006.01)
*H02K 3/34* (2006.01)
*H02K 3/40* (2006.01)

(52) U.S. Cl.
CPC .............. *H02K 3/345* (2013.01); *H02K 3/40* (2013.01)

(58) Field of Classification Search
CPC ............. H02K 3/38; H02K 3/345; H02K 3/40
USPC ................. 310/214–215, 179, 184, 194, 198
See application file for complete search history.

(56) References Cited

U.S. PATENT DOCUMENTS

| 3,575,623 A * | 4/1971 | Stine ................. | H02K 3/38 310/215 |
| 5,659,219 A * | 8/1997 | Momose .............. | H02K 3/38 29/596 |
| 6,064,131 A * | 5/2000 | DeHart ................ | H02K 3/38 29/606 |
| 8,659,204 B2 * | 2/2014 | Shoji .................. | H02K 3/487 310/214 |
| 2017/0294816 A1 * | 10/2017 | Ren ..................... | H02K 1/16 |

FOREIGN PATENT DOCUMENTS

| JP | S56-086045 A | 7/1981 |
| JP | 2000-308314 A | 11/2000 |
| JP | 2006-288041 A | 10/2006 |
| JP | 2007-060819 A | 3/2007 |
| JP | 2008-042959 A | 2/2008 |
| JP | 2012-029354 A | 2/2012 |
| JP | 2013-118717 A | 6/2013 |

* cited by examiner

*Primary Examiner* — Thanh Lam

(74) *Attorney, Agent, or Firm* — Studebaker & Brackett PC

(57) ABSTRACT

A motor includes: a stator core having a plurality of slots; and a winding inserted into the slot as distributed windings of three phases, wherein an interphase insulation sheet is mounted on a coil end of the winding. The interphase insulation sheet includes: planar insulating portions disposed so as to protrude from each of end surfaces of the stator core; a first leg portion and a second leg portion which integrally connect the planar insulating portions at the end surfaces and which are inserted into the slots; insulating convex portions that protrude toward an inner side in a radial direction of the stator core from the planar insulating portion; and a third leg portion that integrally connects the insulating convex portions at the end surfaces and which are inserted into the slot.

5 Claims, 5 Drawing Sheets

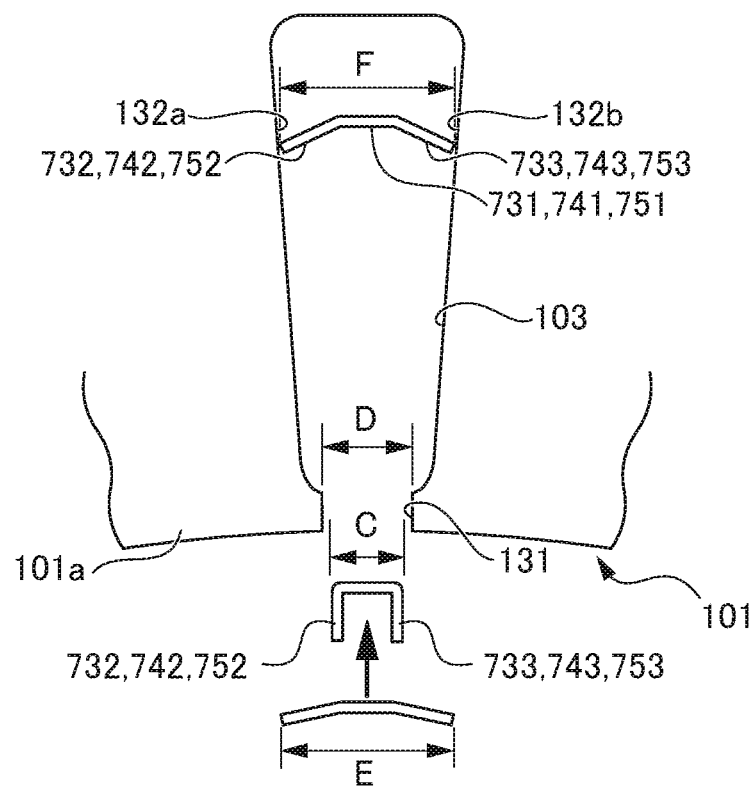

MOTOR HAVING INTERPHASE INSULATION SHEET MOUNTED THEREON

This application is based on and claims the benefit of priority from Japanese Patent Application No. 2016-244563, filed on 16 Dec. 2016, the content of which is incorporated herein by reference.

BACKGROUND OF THE INVENTION

Field of the Invention

The present invention relates to a motor having interphase insulation sheet mounted thereon.

Related Art

Generally, when a voltage specification of a motor (for example, a three-phase alternating-current motor) is relatively high, a high voltage is applied to windings of the motor. Due to this, it is necessary to insert an interphase insulation sheet between the windings of a certain phase and the windings of a different phase to enhance insulation.

Therefore, after the windings of a certain phase are inserted into a slot of a stator core of the motor, an interphase insulation sheet is inserted to be adjacent to a coil end of the winding. After that, the windings of a different phase are inserted into the slot of the stator core to be adjacent to the opposite surface of the interphase insulation sheet.

In order to automate the insertion of the windings of respective phases and the insertion of the interphase insulation sheet, a method of inserting the windings of the three-phase AC in three passes and automatically inserting an interphase insulation sheet by allowing the interphase insulation sheet that connects an insulating portion of a coil end on a winding insertion side and an insulating portion of a coil end on the counter-insertion side in an H-shape to be caught in a dedicated upper tool after inserting the windings of the first pass and the windings of the second pass are proposed (see Japanese Unexamined Patent Application, Publication No. 2007-60819).

In this interphase insulation sheet, the reason why the insulating portion of the coil end on the winding insertion side and the insulating portion of the coil end on the counter-insertion side are connected in the H-shape is to fix the interphase insulation sheet so as to be immovable at the time of inserting windings after inserting the interphase insulation sheet.

SUMMARY OF THE INVENTION

However, in the method of automatically inserting the windings by allowing the windings to be caught in the dedicated upper tool after the interphase insulation sheet that connects the insulating portion of the coil end on the winding insertion side and the insulating portion of the coil end on the counter-insertion side in the H-shape is inserted, there is a concern that windings inserted later may drag and crush the interphase insulation sheet inserted previously with the insertion of the windings. When the interphase insulation sheet is crushed, there is a problem that it is not possible to satisfy a predetermined insulation specification between the windings of a certain phase that the interphase insulation sheet has to insulate and the windings of a different phase.

An object of the present invention is to provide a motor having an interphase insulation sheet mounted thereon, the interphase insulation sheet having such a shape that the interphase insulation sheet inserted previously is not dragged by windings inserted later.

(1) A motor (for example, a motor 11 to be described later) according to the present invention includes: a stator core (for example, a stator core 1 or 101 to be described later) having a plurality of slots (for example, slots 3 or 101 to be described later); and a winding (for example, a winding 5 to be described later) inserted into the slot as distributed windings of three phases, wherein an interphase insulation sheet (for example, an interphase insulation sheet 7 to be described later) is mounted on a coil end (for example, a coil end 6 to be described later) of the winding, and the interphase insulation sheet includes: planar insulating portions (for example, planar insulating portions 71, 71a, 71b to be described later) disposed so as to protrude from end surfaces (for example, each of end surfaces 1a, 1b, 101a to be described later) of the stator core; insulating convex portions (for example, insulating convex portions 72, 72a, 72b to be described later) that protrude toward an inner side in a radial direction of the stator core from the planar insulating portions at the end surfaces; a first leg portion and a second leg portion (for example, first and second leg portions 73 and 74 to be described later) which integrally connect the planar insulating portions at the end surfaces and which are inserted into the slots; and a third leg portion (for example, a third leg portion 75 to be described later) that integrally connects the insulating convex portions at the end surfaces and which are inserted into the slot.

(2) In the motor according to (1), a width (for example, a width A to be described later) along a circumferential direction of the stator core of each of the insulating convex portions on the end surface sides may be larger than a width (for example, a width B to be described later) of a single coil end of the winding.

(3) In the motor according to (1) or (2), the insulating convex portions of the interphase insulation sheet may include convex surfaces (for example, convex surfaces 721a, 721b to be described later) substantially parallel to the planar insulating portions, left-side connecting surfaces (for example, left-side connecting surfaces 722a, 722b to be described later) that connect left-side edges of the convex surfaces and the planar insulating portions, and right-side connecting surfaces (for example, right-side connecting surfaces 725a, 725b to be described later) that connect right-side edges of the convex surfaces and the planar insulating portions, respectively, and in the insulating convex portion at an end surface corresponding to an insertion side of the winding, notch portions (for example, notch portions 728, 729 to be described later) may be formed at corner portions, at the insertion side of the winding, of bent portions (for example, bent portions 723a, 726a to be described later) formed between the convex surface and the left-side connecting surface and between the convex surface and the right-side connecting surface, respectively.

(4) In the motor 11 according to any one of (1) to (3), the first leg portion, the second leg portion, and the third leg portion may have main leg surfaces (for example, main leg surfaces 731, 741, 751 to be described later) substantially parallel to the planar insulating portions and the insulating convex portions, and left and right side surfaces (for example, left and right side surfaces 732, 742, 752, 733, 743, 753 to be described later) protruding obliquely toward an inner side in a radial direction of the stator core from both left and right edges of the main leg surfaces, and the left and right side surfaces may be provided in regions excluding connection portions (for example, connection portions 73a, 73b to be described later) between the first leg portion and the planar insulating portion, connection portions (for example, connection portions 74a, 74b to be described later) between the second leg portion and the planar insulating portion, and connection portions (for example, connection portions 75a, 75b to be described later) between the third leg portion and the insulating convex portion at the end surfaces.

(5) In the motor according to (4), a width (for example, a width C to be described later) along a circumferential direction of the stator core of each of the main leg surfaces in the first leg portion, the second leg portion, and the third leg portion may have such a size that the main leg surface passes through a width (for example, a width D to be described later) of an opening (for example, an opening 31 to be described later) of the slot at an inner end in the radial direction of the stator core, and an entire width (for example, an entire width E to be described later) of each of the first leg portion, the second leg portion, and the third leg portion in a state in which the left and right side surfaces protrude obliquely toward the inner side in the radial direction of the stator core from the main leg surfaces may have a larger size than such a width (for example, a width F to be described later) that, when the first leg portion, the second leg portion, and the third leg portion are arranged inside the slots, the leg portions come into contact with left and right side walls (for example, side walls 32a, 32b, 132a, 132b to be described later) of the slots at the arrangement positions thereof.

According to the present invention, it is possible to provide a motor having an interphase insulation sheet mounted thereon, the interphase insulation sheet having such a shape that the interphase insulation sheet inserted previously is not dragged by windings inserted later.

BRIEF DESCRIPTION OF THE DRAWINGS

FIG. 6 is an enlarged cross-sectional view illustrating a relation between a shape and dimensions of a slot of a motor according to another embodiment of the present invention and a shape and dimensions of a leg portion of an interphase insulation sheet, in which the width of the slot increases as it advances outward in the radial direction of a stator core.

DETAILED DESCRIPTION OF THE INVENTION

Figure 1:
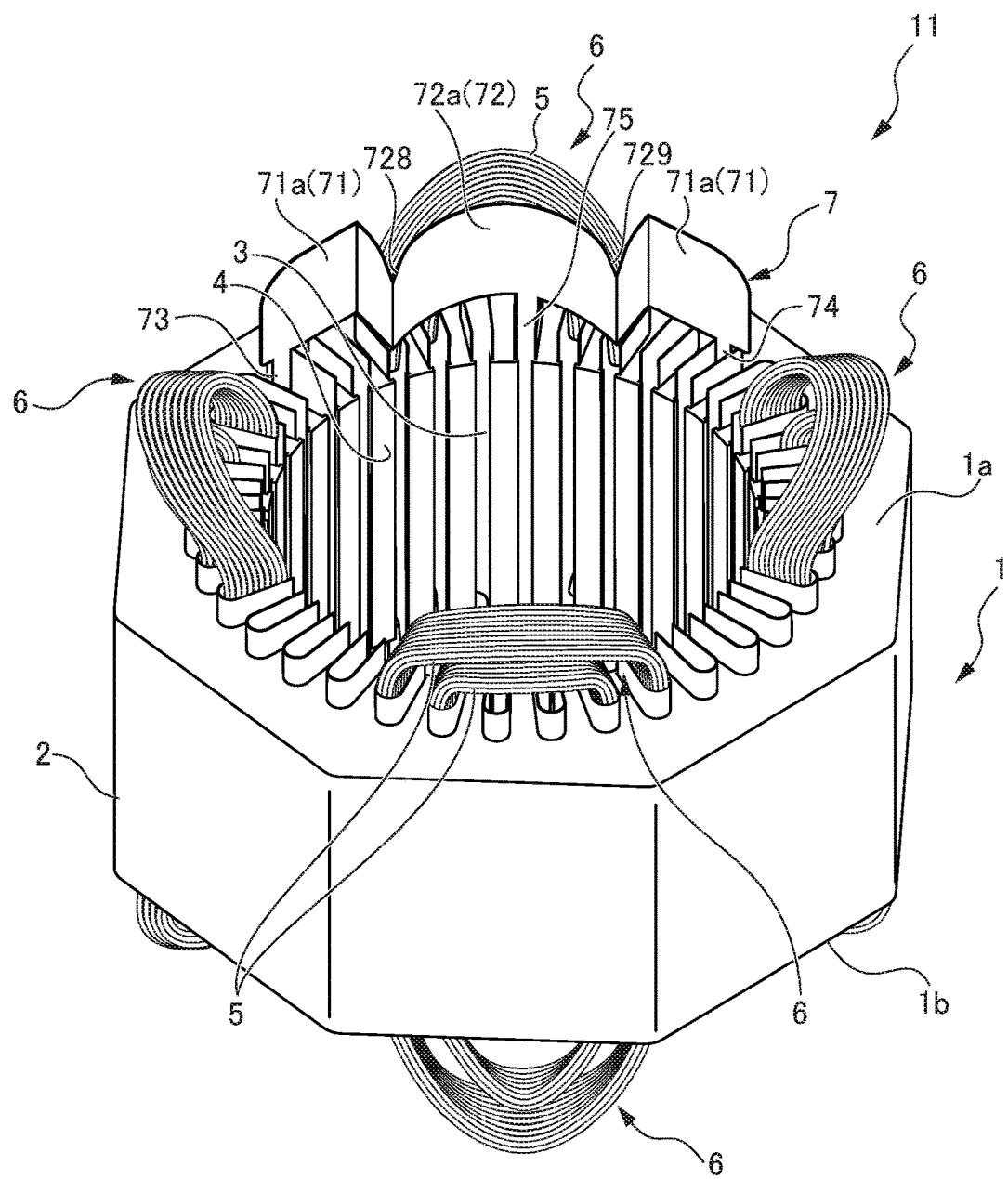
FIG. 1 is a perspective view as seen from an insertion side of windings, illustrating a state in which, in a process of manufacturing a motor according to an embodiment of the present invention, after first windings (four windings are illustrated) are inserted into a slots of a stator core, an interphase insulation sheet is disposed on an inner side of one winding in a radial direction of the stator core.

Hereinafter, embodiments of the present invention will be described with reference to the drawings. FIG. 1 is a diagram illustrating a motor 11 according to an embodiment. In FIG. 1, a rotor of the motor 11 is omitted.

Figure 2:
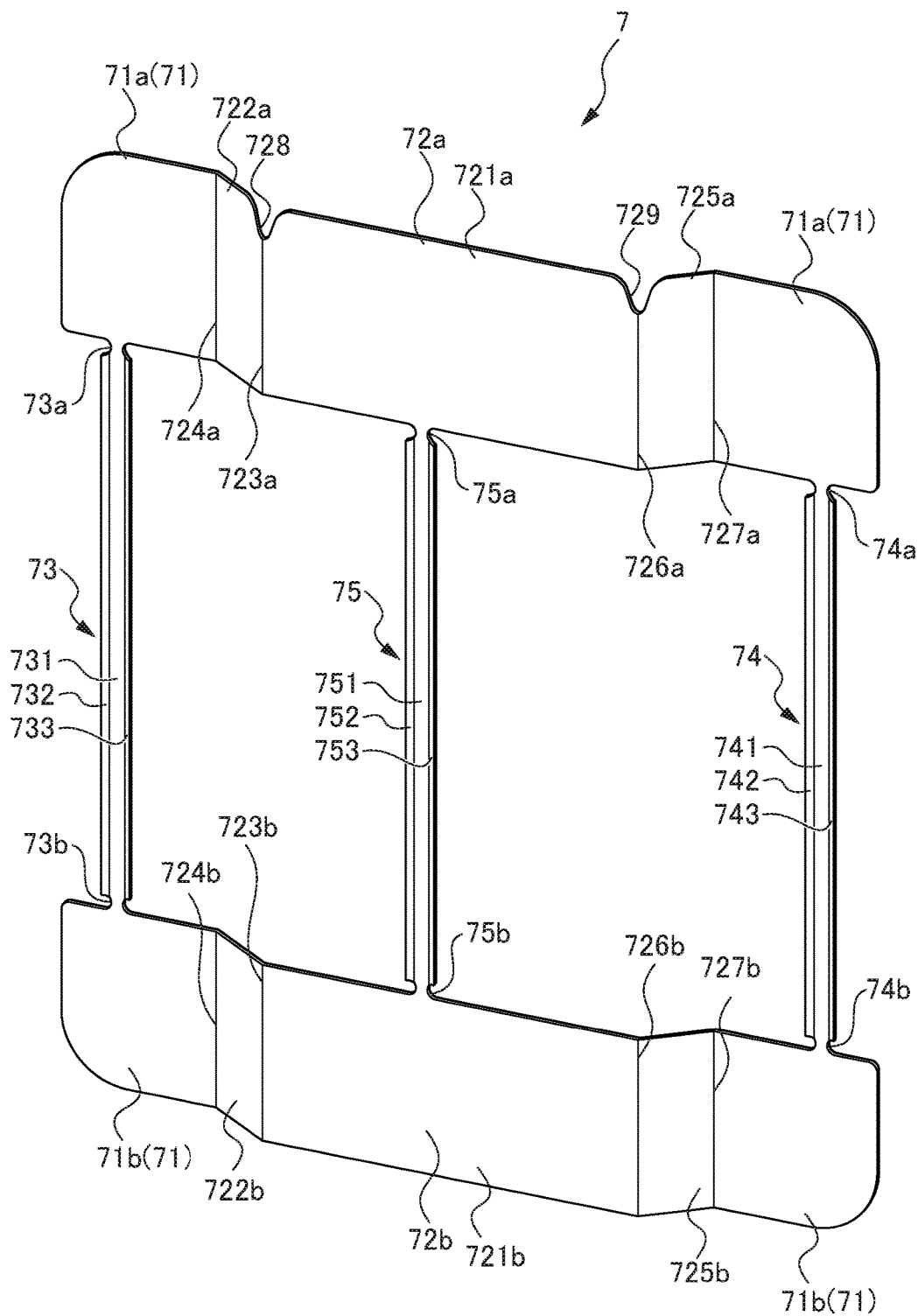
FIG. 2 is a perspective view illustrating an interphase insulation sheet used in the motor illustrated in FIG. 1.

As illustrated in FIG. 1, the motor 11 includes a stator core 1 obtained by laminating electromagnetic steel sheets 4 and having a plurality of slots 3 and teeth 4 and windings 5 inserted into the slots 3 as distributed windings of three phases. That is, first (in a first pass), the winding 5 of a first phase is inserted into the slots 3 to form a coil end 6, and an interphase insulation sheet 7 (see FIG. 2) is mounted on the coil end 6. Subsequently (in a second pass), the winding 5 of a second phase is inserted into the slots 3 to form a coil end 6, and an interphase insulation sheet 7 (not illustrated) having the same shape as the interphase insulation sheet illustrated in FIG. 2 are mounted on the coil end 6. After that (in a third pass), the winding 5 of a third phase is inserted into the slots 3. The winding 5 of each phase is made up of an outer winding and an inner winding and the two windings are inserted into the slots 3 at once.

As illustrated in FIG. 2, the interphase insulation sheet 7 is formed of an appropriate material (for example, a plastic material) having excellent electric insulation. The interphase insulation sheet 7 is formed by punching one piece of sheet (film) to obtain a blank member and pressing and bending the blank member. Specifically, the interphase insulation sheet 7 has a planar insulating portion 71 (71a and 71b), an insulating convex portion 72 (72a and 72b), a first leg portion 73, a second leg portion 74, and a third leg portion 75.

The planar insulating portions 71a and 71b are disposed so as to protrude from end surfaces 1a and 1b of the stator core 1, respectively. The planar insulating portion 71a is disposed at an end of the slot 3 formed in the end surface 1a of the stator core 1, into which the winding 5 is inserted, (hereinafter referred to as an insertion side). On the other hand, the planar insulating portion 71b is disposed at a side opposite to the insertion side, i.e., at an end of the slot 3 formed in the end surface 1b.

The insulating convex portions 72a and 72b are disposed so as to protrude toward an inner side in a radial direction of the stator core 1 from the planar insulating portions 71a and 71b, respectively. The insulating convex portion 72a is disposed so as to protrude from the planar insulating portion 71a and is accordingly disposed on the insertion side of the winding 5 with respect to the slot 3. On the other hand, the insulating convex portion 72b is disposed so as to protrude from the planar insulating portion 71b and is accordingly disposed on the opposite side of the insertion side of the winding 5 with respect to the slot 3.

The first leg portion 73 and the second leg portion 74 connect the planar insulating portions 71a and 71b integrally. For example, when the motor 10 is seen in the orientation as shown in FIG. 1 where the insulating convex portion 72a is at the top and the insulating convex portion 72b is at the bottom, the first leg portion 73 connects the planar insulating portions 71a and 71b integrally at portions near the left ends of the interphase insulation sheet 7. The second leg portion 74 connects the planar insulating portions 71a and 71b integrally at portions near the right ends of the interphase insulation sheet 7. The third leg portion 75 connects the insulating convex portions 72a and 72b integrally.

Figure 3:
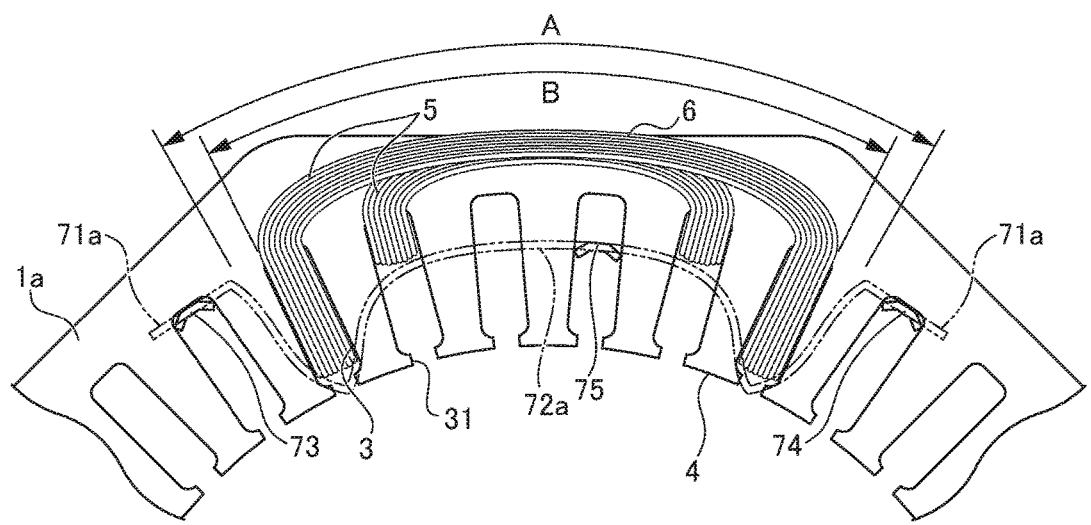
FIG. 3 is a cross-sectional view illustrating a positional relation among a coil end of one winding, a slot, and an interphase insulation sheet in the state of FIG. 1.

A width of each of the insulating convex portions 72a and 72b (i.e., a width A in a circumferential direction of the stator core 1) is larger than a width B of a single coil end 6 of the winding 5 (see FIG. 3).

The insulating convex portions 72a and 72b include convex surfaces 721a and 721b substantially parallel to the planar insulating portions 71a and 71b, left-side connecting surfaces 722a and 722b that connect the left-side edges of the convex surfaces 721a and 721b and the planar insulating portions 71a and 71b, and right-side connecting surfaces 725a and 725b that connect the right-side edges of the convex surfaces 721a and 721b and the planar insulating portions 71a and 71b, respectively.

Bent portions 723a and 723b are formed at the boundaries between the convex surfaces 721a and 721b and the left-side connecting surfaces 722a and 722b, respectively. Bent portions 724a and 724b are formed at the boundaries between the left-side connecting surfaces 722a and 722b and the planar insulating portions 71a and 71b, respectively.

Bent portions 726a and 726b are formed at the boundaries between the convex surfaces 721a and 721b and the right-side connecting surfaces 725a and 725b, respectively. Bent portions 727a and 727b are formed at the boundaries between the right-side connecting surfaces 725a and 725b and the planar insulating portions 71a and 71b, respectively.

The insulating convex portion 72a disposed on the insertion side of the winding 5 with respect to the slot 3 has notch portions 728 and 729 formed in the bent portion 723a at the boundary between the convex surface 721a and the left-side connecting surface 722a and the bent portion 726a at the boundary between the convex surface 721a and the right-side connecting surface 725a, respectively. The notch portions 728 and 729 are formed by removing and smoothing sharp distal ends of the bent portions 723a and 726a, respectively.

The first leg portion 73 and the second leg portion 74 have main leg surfaces 731 and 741 substantially parallel to the planar insulating portion 71 and left side surfaces 732 and 742 and right side surfaces 733 and 743 protruding obliquely toward an inner side in the radial direction of the stator core 1 from both left and right edges of the main leg surfaces 731 and 741, respectively. Similarly, the third leg portion 75 has a main leg surface 751 substantially parallel to the insulating convex portion 72 and a left side surface 752 and a right side surface 753 protruding obliquely toward an inner side in the radial direction of the stator core 1 from both left and right edges of the main leg surface 751.

The left side surfaces 732, 742, and 752 and the right side surfaces 733, 743, and 753 of the first, second, and third leg portions 73, 74, and 75 are formed in regions excluding the connection portions between the first leg portion 73 and the planar insulating portions 71a and 71b, the connection portions between the second leg portion 74 and the planar insulating portions 71a and 71b, and the connection portions between the third leg portion 75 and the insulating convex portions 72a and 72b.

Figure 4:
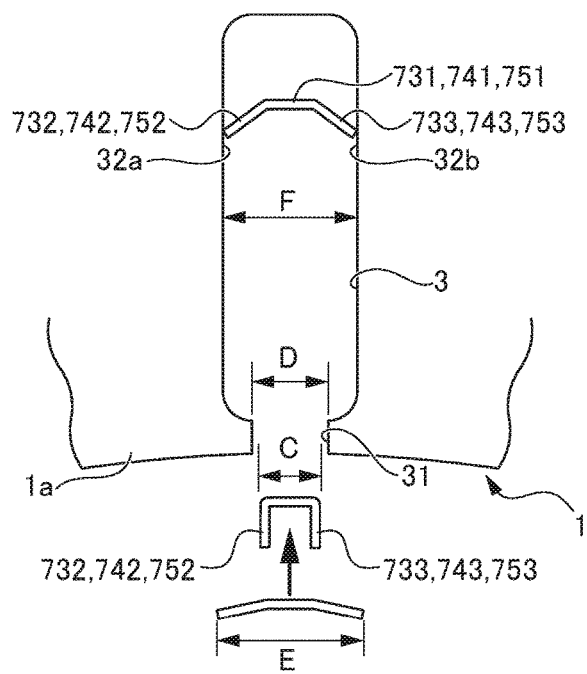
FIG. 4 is an enlarged cross-sectional view illustrating a relation between a shape and dimensions of a slot and a shape and dimensions of a leg portion of an interphase insulation sheet in the state of FIG. 3, in which the width of the slot is constant along a radial direction of the stator core.
Figure 5:
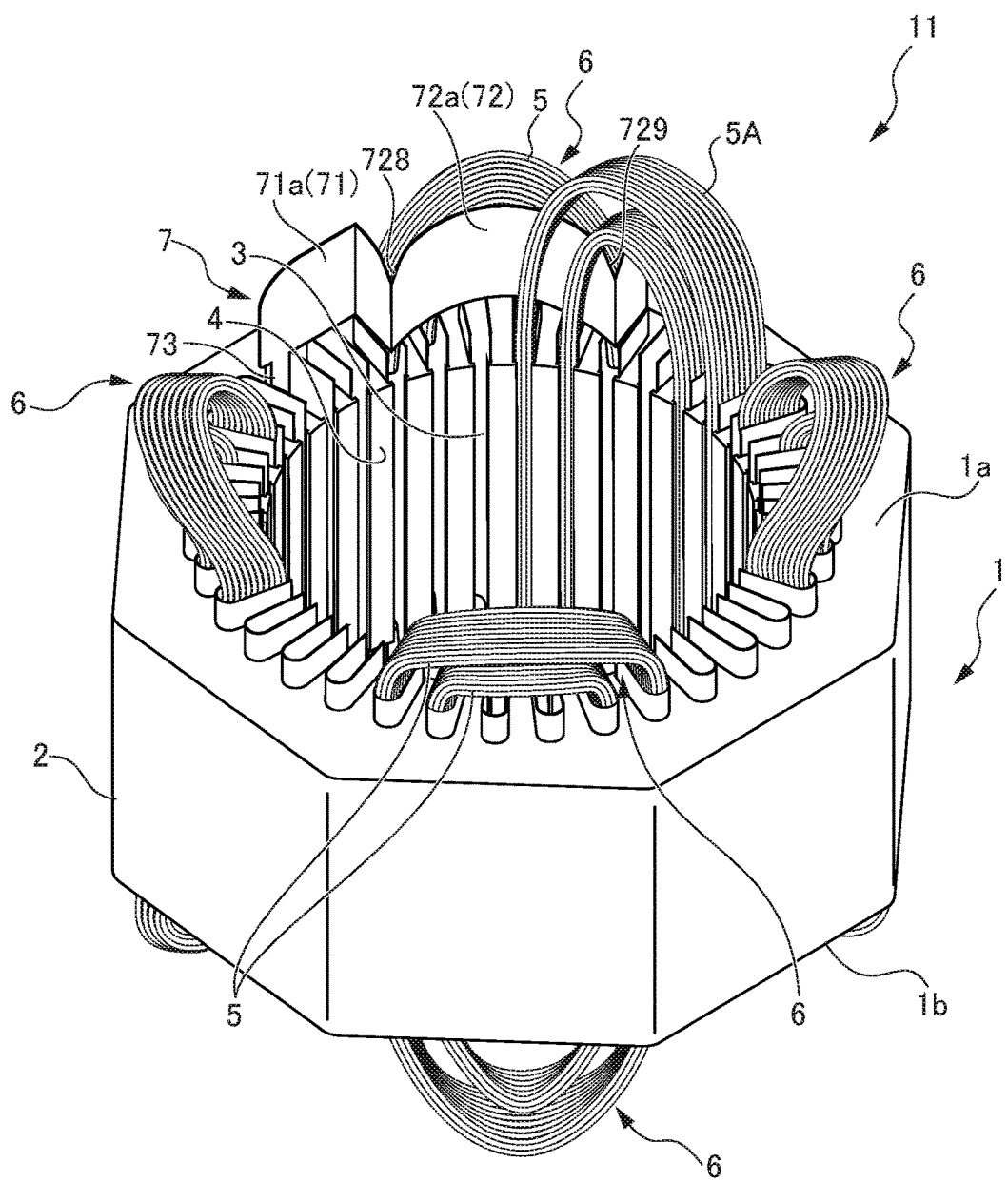
FIG. 5 is a perspective view as seen from an insertion side of windings, illustrating a state in which second windings (only one winding is illustrated) are inserted into slots of the stator core on the inner side of the interphase insulation sheet in the state of FIG. 1.

In the first, second, and third leg portions 73, 74, and 75, a width of each of the main leg surfaces 731, 741, and 751 (that is, a width C in a circumferential direction of the stator core 1) has such a size that the main leg surface passes through a width D of the opening 31 of the slot 3 at an inner end in the radial direction of the stator core 1 (see FIG. 4).

Specifically, the main leg surface has such a size that, when the first, second, and third leg portions 73, 74, and 75 are pushed into the openings 31 of the slots 3, the left side surfaces 732, 742, and 752 and the right side surfaces 733, 743, and 753 are bent at least at 90° with respect to the main leg surfaces 731, 741, and 751 so that when the main leg surfaces 731, 741, and 751 pass through the openings 31 of the slots 3, the left side surfaces 732, 742, and 752 and the right side surfaces 733, 743, and 753 can pass the openings 31 similarly (D≥C).

When the left side surfaces 732, 742, and 752 and the right side surfaces 733, 743, and 753 of the first, second, and third leg portions 73, 74, and 75 pass through the openings 31 of the slots 3, the restoring force such as a springback force is exerted and the surfaces restore to a state of protruding obliquely toward an inner side in the radial direction of the stator core 1 from both left and right edges of the main leg surfaces 731, 741, and 751.

An entire width E of each of the first, second, and third leg portions 73, 74, and 75 in the restored state is larger than a width F of the slot 3 along the circumferential direction of the stator core 1 (that is, the interval between the left and right side walls 32a and 32b of the slot 3) (see FIG. 4). The slot 3 has a constant width F along the radial direction of the stator core 1 excluding the width D of the opening 31. Specifically, in the restored state, the width E from the left-side edge of each of the left side surfaces 732, 742, and 752 of the first, second, and third leg portions 73, 74, and 75 to the right-side edge of each of the right side surfaces 733, 743, and 753 is larger than the width F of the slot 3 (E>F).

Therefore, the left-side edge of each of the left side surfaces 732, 742, and 752 and the right-side edge of each of the right side surfaces 733, 743, and 753 of the first, second, and third leg portions 73, 74, and 75 in the restored state come into contact with the left and right side walls 32a and 32b of the slot 3, respectively. Due to this, the first, second, and third leg portions 73, 74, and 75 easily follow such a movement of being pushed toward an inner side inside the slot 3 and exhibit such a movement of exhibiting resistance that the leg portions are moved forward.

Next, a method of mounting the above-described interphase insulation sheet 7 and the effect thereof will be described. As illustrated in FIG. 1, the winding 5 of the first phase is disposed by inserting the same into predetermined slots 3 of the stator core 1. By doing so, the coil end 6 of the winding 5 of the first phase is formed. The interphase insulation sheet 7 is mounted on the coil end 6.

That is, the interphase insulation sheet 7 is mounted from the inner side in the radial direction of the stator core 1 so that the insulating convex portions 72a and 72b accommodate the coil end 6 on the end surfaces 1a and 1b of the stator core 1, respectively, the third leg portion 75 enters into one slot 3 within the width range of the coil end 6, and the first and second leg portions 73 and 74 each enter into one slot 3 on the outer side of the width of the coil end 6.

Specifically, when the coil end 6 is configured using six slots 3 adjacent in the circumferential direction of the stator core 1 as one group, the interphase insulation sheet 7 is pushed so that the first leg portion 73 enters into the slot 3 at the second place to the left side of the left end of the six slots, the second leg portion 74 enters into the slot 3 at the second place to the right side of the right end of the six slots, the third leg portion 75 enters into the slot 3 at the position corresponding to the center of the six slots, and any one of the first, second, and third leg portions 73, 74 and 75 are positioned on the inner side of the respective slots 3.

In this process, when the first, second, and third leg portions 73, 74, and 75 receive external force urging the passing thereof when passing through the openings 31 of the respective slots 3, the left side surfaces 732, 742, and 752 and the right side surfaces 733, 743, and 753 can be bent at least at 90° with respect to the main leg surfaces 731, 741, and 751, respectively. In this way, when the main leg surfaces 731, 741, and 751 pass through the openings 31 of the slots 3, the left side surfaces 732, 742, and 752 and the right side surface 733, 743, and 753 also pass through the openings 31.

When the first, second, and third leg portions 73, 74, and 75 pass through the openings 31 of the respective slots 3 to enter inside of the slots 3, the restoring force such as a springback force is exerted and the left side surfaces 732, 742, and 752 and the right side surfaces 733, 743, and 753 restore to a state of protruding obliquely toward an inner side in the radial direction of the stator core 1 from the both left and right edges of the main leg surfaces 731, 741, and 751, respectively. In this restored state, the entire width E of each of the first, second, and third leg portions 73, 74, and 75 is larger than the width F of the slot 3 (E>F).

Therefore, in the restored state, the left-side edge of each of the left side surfaces 732, 742, and 752 and the right-side edge of each of the right side surfaces 733, 743, and 753 of the first, second, and third leg portions 73, 74, and 75 come into contact with the left and right side walls 32a and 32b of the slot 3, respectively. Due to this, the first, second, and third leg portions 73, 74, and 75 easily follow such a movement of being pushed toward an inner side inside the slot 3 and exhibit such a movement of exhibiting resistance that the leg portions are moved forward. At the same time, the first, second, and third leg portions 73, 74, and 75 act such that the planar insulating portions 71a and 71b and the insulating convex portions 72a and 72b maintain a predetermined curved shape.

As a result, the interphase insulation sheet 7 mounted on the stator core 1 can be inserted so as to be along the inner side of the coil end 6. Due to this, a relatively large space is realized on the inner side in the radial direction of the stator core 1 so as to be separated from the interphase insulation sheet 7.

Using this space, the winding 5 of the second phase is inserted and disposed in predetermined slots 3 of the stator core 1. In this case, the risk of the interphase insulation sheet 7 being dragged by the winding 5 of the second phase is reduced due to the notch portions 728 and 729 formed in the bent portion 723a at the boundary between the convex surface 721a and the left-side connecting surface 722a of the insulating convex portion 72a and the bent portion 726a at the boundary between the convex surface 721a and the right-side connecting surface 725a of the insulating convex portion 72a, respectively.

For example, if the notch portions 728 and 729 were not formed, the distal end of the bent portion 723a at the boundary between the convex surface 721a and the left-side connecting surface 722a of the insulating convex portion 72a and the distal end of the bent portion 726a at the boundary between the convex surface 721a and the right-side connecting surface 725a of the insulating convex portion 72a would be sharp. Due to this, when the winding 5 of the second phase is inserted into predetermined slots 3, the winding 5 is likely to be caught in the sharp distal ends of the bent portions 723a and 726a, and the winding 5 may drag the interphase insulation sheet 7 if the winding is caught therein and may deform the interphase insulation sheet 7 so as to be removed from the original position. Due to the presence of the notch portions 728 and 729, the risk of such dragging of the interphase insulation sheet 7 is reduced.

Therefore, it is possible to insert the winding 5 of the second phase in a state in which the risk of dragging of the interphase insulation sheet 7 is reduced. After that, after the interphase insulation sheet 7 is mounted in a similar manner, the winding 5 of the second phase is inserted, whereby the motor 11 on which the interphase insulation sheet 7 is mounted between respective phases is obtained.

According to the motor 11 having the above-described interphase insulation sheet 7 mounted thereon, the following advantages are obtained. The interphase insulation sheet 7 has the third leg portion 75 which connects the insulating convex portions 72a and 72b of the interphase insulation sheet 7 at the end surfaces 1a and 1b of the stator core 1 integrally and which is inserted into the slot 3. Due to this, it is possible to reduce a concern that the insulating convex portions 72a and 72b are dragged by a winding 5A to be inserted subsequently at the time of inserting the winding 5A and the interphase insulation sheet 7 is dragged by the winding 5A.

Moreover, the width A of each of the insulating convex portions 72a and 72b of the interphase insulation sheet 7 is larger than the width B of a single coil end 6 of the winding 5. Due to this, it is possible to arrange the interphase insulation sheet 7 so as to be along the inner side of the winding 5. In this way, the interphase insulation sheet 7 does not block the passage of the winding 5A to be inserted subsequently.

Moreover, in the planar insulating portions 71a of the interphase insulation sheet 7, the notch portions 728 and 729 are formed at the corner portions, at the winding insertion side, of the bent portion 723a formed between the convex surface 721a and the left-side connecting surface 722a and the bent portion 726a formed between the convex surface 721a and the right-side connecting surfaces 725a, respectively. Due to this, the winding 5A to be inserted subsequently is less likely to be caught in the bent portions 723a and 726a of the planar insulating portions 71a and 71b. In this way, a winding step of the winding 5 to be inserted subsequently can be executed smoothly and in a short period.

Moreover, the first, second, and third leg portions 73, 74, and 75 of the interphase insulation sheet 7 have the main leg surfaces 731, 741, and 751 substantially parallel to the planar insulating portions 71a and 71b and both left and right side surfaces 732, 742, and 752 and 733, 743, and 753 protruding obliquely toward an inner side in the radial direction of the stator core 1 from the both left and right edges of the main leg surfaces 731, 741, and 751. The left and right side surfaces 732, 742, and 752 and 733, 743, and 753 are formed in regions excluding the connection portions 73a, 73b, 74a, 74b, 75a, and 75b between the first, second, and third leg portions 73, 74, and 75 and the planar insulating portions 71a and 71b close to each of the end surfaces 1a and 1b and the insulating convex portions 72a and 72b.

Due to this, the interphase insulation sheet 7 including the respective leg portions 73, 74, and 75 can be formed relatively easily by a step of punching a material sheet to obtain a blank member and a step of pressing the punched blank member. In this way, it is possible to reduce the cost of the interphase insulation sheet 7.

Moreover, the width C of each of the main leg surfaces 731, 741, and 751 of the first, second, and third leg portions 73, 74, and 75 of the interphase insulation sheet 7 has such a size (D≥C) that the main leg surface passes through the width D of the opening 31 of the slot 3 at the inner end in the radial direction of the stator core 1, and the entire width E of each of the first, second, and third leg portions 73, 74, and 75 in a state in which the left and right side surfaces 732, 742, and 752 and 733, 743, and 753 protrude obliquely toward an inner side in the radial direction of the stator core 1 from the main leg surfaces 731, 741, and 751 has a size (E>F) larger than the width F in the slot.

Due to this, when the interphase insulation sheet 7 is disposed in the stator core 1, the left and right side surfaces 732, 742, and 752 and 733, 743, and 753 of each of the leg portions 73, 74, and 75 are bent at a large angle (for example, approximately 90°) with respect to the main leg surfaces 731, 741, and 751 by both side edges of the opening 31 of the slot 3, whereby each of the leg portions 73, 74, and 75 can be inserted into the slots 3 of the stator core 1 while maintaining a state in which the facing direction of the main leg surfaces 731, 741, and 751 does not substantially deviate from the axial center of the stator core 1.

Moreover, the left and right side surfaces 732, 742, and 752 and 733, 743, and 753 of each of the leg portions 73, 74, and 75 which have already been inserted into the slots 3 can spread in a horizontal direction by increasing their bending angle with respect to the main leg surfaces 731, 741, and 751, and horizontal spreading following the width of the slot 3 can be obtained depending on the width. In this way, when each of the leg portions 73, 74, and 75 are inserted into the slots 3 and are pressed against the windings in the slots 3, each of the leg portions 73, 74, and 75 are suppressed from returning toward an inner side in the radial direction of the stator core 1 from the insertion positions. Therefore, each of the leg portions 73, 74, and 75 can effectively restrict the windings 5 positioned on the inner side of the slots 3 from being loosened and moving toward the inner side in the radial direction of the stator core 1.

FIG. 6 is an enlarged cross-sectional view illustrating a relation between a shape and dimensions of a slot of a motor according to another embodiment of the present invention and a shape and dimensions of a leg portion of an interphase insulation sheet, in which the width of a slot 103 increases as it advances outward in the radial direction of a stator core 101. In this slot 103, an entire width E of each of the first, second, and third leg portions 73, 74, and 75 may have a size larger than such a width that, when the first, second, and third leg portions 73, 74, and 75 are arranged inside the slots 103, the leg portions come into contact with the left and right side walls 132a and 132b of each of the slots 103 at the arrangement positions. In other words, the entire width E of each of the first, second, and third leg portions 73, 74, and 75 may not have a larger size than the width of the slot 103 on the outermost side in the radial direction of the stator core 101.

While an embodiment of the present invention has been described, the present invention is not limited to the above-described embodiment. Moreover, the advantages described in the embodiment of the present invention are only examples of most preferable advantages produced by the present invention, and the advantages of the present invention are not limited to those described in the present embodiment.

EXPLANATION OF REFERENCE NUMERALS 1, 101: Stator core
1a, 1b, 101a: End surface
3, 103: Slot
31, 131: Opening
32a, 32b, 132a, 132b: Side wall
5: Winding
6: Coil end
7: Interphase insulation sheet
11: Motor
71, 71a, 71b: Planar insulating portion
72, 72a, 72b: Insulating convex portion
721a, 721b: Convex surface
722a, 722b: Left-side connecting surface
725a, 725b: Right-side connecting surface
723a, 726a: Bent portion
728, 729: Notch portion
73: First leg portion
73a, 73b: Connection portion
74: Second leg portion
74a, 74b: Connection portion
75: Third leg portion
75a, 75b: Connection portion
731, 741, 751: Main leg surface
732, 742, 752: Left side surface
733, 743, 753: Right side surface

What is claimed is:

1. A motor having an interphase insulation sheet mounted thereon, comprising:
   a stator core having a plurality of slots; and
   a winding inserted into the slot as distributed windings of three phases, wherein
   the interphase insulation sheet is mounted on a coil end of the winding, and
   the interphase insulation sheet includes:
   planar insulating portions disposed so as to protrude from each of end surfaces of the stator core;
   insulating convex portions that protrude toward an inner side in a radial direction of the stator core from the planar insulating portions at the end surfaces;
   a first leg portion and a second leg portion which integrally connect the planar insulating portions at the end surfaces and which are inserted into the slots; and
   a third leg portion that integrally connects the insulating convex portions at the end surfaces and which are inserted into the slot.

2. The motor having the interphase insulation sheet mounted thereon according to claim 1, wherein
   a width along a circumferential direction of the stator core of each of the insulating convex portions on the sides close to each of the end surface is larger than a width of a single coil end of the winding.

3. The motor having the interphase insulation sheet mounted thereon according to claim 1, wherein
   the insulating convex portions of the interphase insulation sheet include convex surfaces substantially parallel to the planar insulating portions, left-side connecting surfaces that connect left-side edges of the convex surfaces and the planar insulating portions, and right-side connecting surfaces that connect right-side edges of the convex surfaces and the planar insulating portions, respectively, and
   in the insulating convex portion at an end surface corresponding to an insertion side of the winding, notch portions are formed at corner portions, at the insertion side of the winding, of bent portions between the convex surface and the left-side connecting surface and between the convex surface the right-side connecting surfaces, respectively.

4. The motor having the interphase insulation sheet mounted thereon according to claim 1, wherein
   the first leg portion, the second leg portion, and the third leg portion have main leg surfaces substantially parallel to the planar insulating portions and the insulating convex portions, and left and right side surfaces protruding obliquely toward an inner side in a radial direction of the stator core from both left and right edges of the main leg surfaces, and
   the left and right side surfaces are provided in regions excluding connection portions between the first leg portion and the planar insulating portion, connection portions between the second leg portion and the planar insulating portion, and connection portions between the third leg portion and the insulating convex portion at the end surfaces.

5. The motor having the interphase insulation sheet mounted thereon according to claim 4, wherein a width along a circumferential direction of the stator core of each of the main leg surfaces in the first leg portion, the second leg portion, and the third leg portion has such a size that the main leg surface passes through a width of an opening of the slot at an inner end in the radial direction of the stator core, and an entire width of each of the first leg portion, the second leg portion, and the third leg portion in a state in which the left and right side surfaces protrude obliquely toward the inner side in the radial direction of the stator core from the main leg surfaces is larger than a width of each of the first leg portion, the second leg portion, and the third leg portion between left and right side walls of the slot when each of the first leg portion, the second leg portion, and the third leg portion is arranged inside of the slot to be in contact therewith and sandwiched there between.

\* \* \* \* \*